United States Patent [19]

Kato et al.

[11] 4,415,920
[45] Nov. 15, 1983

[54] IMAGE SIGNAL PROCESSING UNIT

[75] Inventors: Yuzo Kato; Nobuyoshi Tanaka, both of Yokohama; Naoto Kawamura, Inagi; Hisashi Nakatsui, Kawasaki; Shunichi Ishihara, Kodaira; Yasushi Sato, Kawasaki, all of Japan

[73] Assignee: Canon Kabushiki Kaisha, Tokyo, Japan

[21] Appl. No.: 301,777

[22] Filed: Sep. 14, 1981

[30] Foreign Application Priority Data

Sep. 19, 1980 [JP] Japan .................................. 55-129209
Sep. 19, 1980 [JP] Japan .................................. 55-129210

[51] Int. Cl.$^3$ ............................................ H04N 9/535
[52] U.S. Cl. .................................. 358/37; 358/21 R; 358/80
[58] Field of Search ................... 358/37, 80, 283, 160, 358/96, 21 R

[56] References Cited

U.S. PATENT DOCUMENTS 4,032,978 6/1977 Wong .................................. 358/283
4,281,347 7/1981 Tschannen ........................... 358/37

Primary Examiner—Richard Murray
Attorney, Agent, or Firm—Fitzpatrick, Cella, Harper & Scinto

[57] ABSTRACT

An image signal processing unit is disclosed which comprises: a contour extraction processing circuit for extracting a contour part from an input image signal, a color signal conversion processing circuit for replacing color signals of the contour part with contour emphasizing color signals on the basis of an output signal from said contour extraction processing circuit, and an image conversion processing circuit for producing a contour emphasized image signal from the input image signal and an output signal from said color signal conversion processing circuit. The image signals input to the image signal processing unit are converted to image signals suitable for display or printing.

21 Claims, 12 Drawing Figures

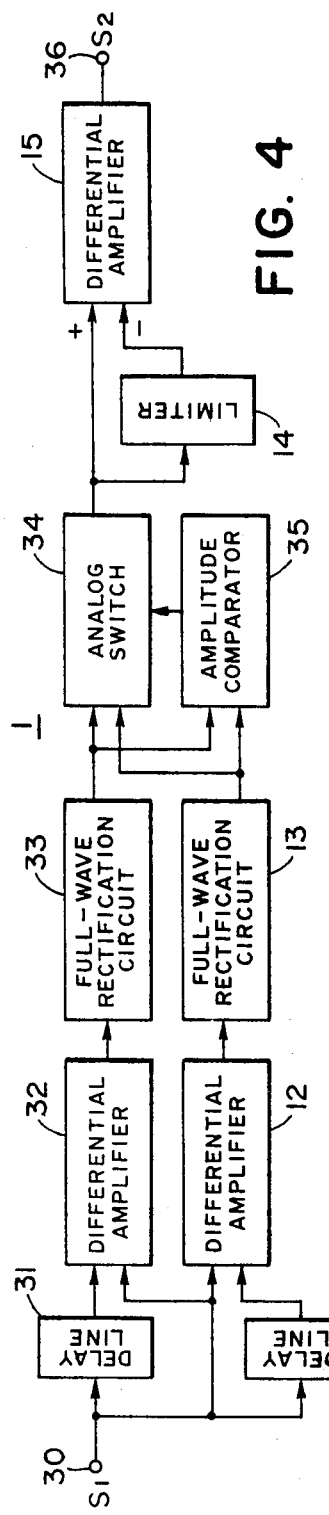
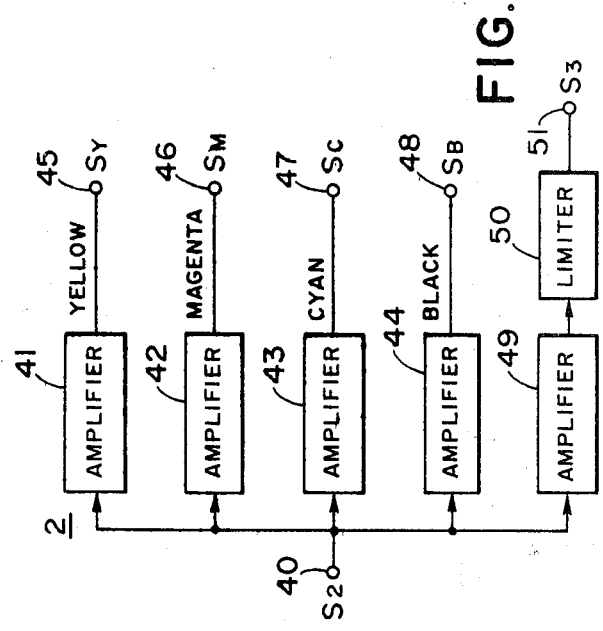

IMAGE SIGNAL PROCESSING UNIT

BACKGROUND OF THE INVENTION

1. Field of the Invention

The present invention relates to an image signal processing unit according to which input image signals are replaced by image signals which are suitable for display or printing.

2. Description of the Prior Art

Image display devices, such as television receivers and photocopy machines, are used daily in homes and offices. These image display devices are required to form images which have special qualities to respond to the needs of the viewers, rather than to reproduce images in a natural and exact manner. For example, with a color television receiver in Japan, the skin color is displayed more whitish than the natural color to correspond with the color which is preferred by the viewer. Another example of processing of image data according to perception or preferred taste by the viewer is the emphasis of contour. This is based on the fact that human eyes perceive objects mainly on the basis of contour data. Especially in a display, such as a poster, in which clarity is of prime importance, the edges of the letters are fringed to emphasize the contour.

A prior art example of an image display device for obtaining an image with emphasized contour will be described. An image with emphasized contour may be obtained by the addition of an original image with a contour image. The contour image is considered to be an image consisting of high frequency signal components of the original image. According to an example of a method for extracting high frequency signal components from the original image, an image signal is formed which is the absolute value of the difference between the original image and an image which is slightly shifted from the original image. According to this method, the image signal of the absolute value of the signal obtained by subtracting spatially different signals of the original image is obtained, thus establishing the extraction of the high frequency signal components of the signal of the original image.

In order to obtain an image with emphasized contour by the addition of the contour image and the original image, processings such as optical processing, processing with an electric circuit, and processing with a computer have been performed.

However, with the prior art technique described above, an image with emphasized contour is obtained by emphasizing the luminance or density contrast of the edge of the image. This has led to a disadvantage in that a device which is capable of sufficiently displaying gradation is required.

Devices for displaying images with discrete binary patterns are known, such as plasma panels and liquid crystal displays, in which display cells of the same size are arranged in a matrix form and each cell can take only two values (on and off), and ink-jet printers in which the dot pattern formed by the injected ink can take only two values (on and off). These devices are utilized in image display devices such as panel displays and facsimiles.

These devices must be able to perform contour emphasis display and half-tone display in order to improve the image quality.

The systematic dither method is known as a conventional method for performing the half-tone display with the discrete binary pattern. According to the systematic dither method, the entire display screen consisting of a dot matrix is divided into submatrices of n×n dots, and the respective dots of each submatrix are set at mutually different threshold levels. An example of the systematic dither method is described in U.S. Pat. No. 4,032,978 of Wong.

It is known that the image quality may be particularly improved by combining the contour emphasis processing and the half-tone display processing. However, if the width of the contour is below the submatrix of the dither pattern when the half-tone display processing by the dither method is performed after the contour emphasis processing, the relationship between the lightness, saturation, and hue may be disturbed by the signal conversion in the dither method. This leads to mixture of colors.

SUMMARY OF THE INVENTION

It is an object of the present invention to provide an image signal processing device which is capable of obtaining clear images with perceptually emphasized contours utilizing simultaneous contrast, and which may be applied to devices that are incapable of sufficiently displaying gradation.

It is another object of the present invention to provide an image signal processing device which performs, in combination, contour emphasis processing and half-tone display processing.

It is still another object of the present invention to provide an image signal processing device which separately performs half-tone display processing for the contour part of an image and the remaining part of the image excluding the contour part, and which synthesizes the output signals from half-tone display processing of both parts to obtain image signals.

It is still another object of the present invention to provide a color image signal processing device which utilizes simultaneous contrast (to be described later).

These and other objects and features of the present invention will become apparent from the following detailed description and the accompanying drawings.

BRIEF DESCRIPTION OF THE DRAWINGS

FIG. 4 is a block diagram showing another example of the contour extraction processing circuit;

FIG. 5 is a block diagram showing an example of a color signal conversion processing circuit shown in FIG. 1;

DESCRIPTION OF THE PREFERRED EMBODIMENTS

Simultaneous contrast will briefly be explained for the purpose of easy understanding of the present invention. Simultaneous contrast refers to a phenomenon in which the color contrast of two different colors is emphasized when the colors are placed next to each other. This phenomenon is further classified into three different types of contrast: the lightness contrast, the hue contrast, and the saturation contrast, which will be individually explained below:

(1) Lightness Contrast of Chromatic Colors

The lower the lightness of the pure colors, the clearer they may be perceived when placed on a white background. To the contrary, yellow of the highest lightness is perceived most clearly on a black background. With a gray background of medium lightness, any color may exhibit its own chromaticity.

(2) Hue Contrast

When red and purple are placed next to each other, the portion of the red color adjacent to the purple color looks orange, and the purple color adjacent to the red color looks almost bluish purple. When a white or black line is drawn at the boundary of the two colors, this phenomenon vanishes.

(3) Saturation Contrast

When orange of the same lightness is placed on a pure orange background and on a gray background, the orange on the gray background appears to have a higher saturation. When a mixed red color is placed on a pure red background and on a gray background, the mixed red color placed on the gray background appears to have a higher saturation.

These phenomena as described above are applied to the processing field wherein the apparent contrast is emphasized by a pseudocolor display in which the neutral images are colored according to the density.

According to the present invention, a gray color of medium lightness is used at the contour parts of color images in consideration of the simultaneous contrast. Accordingly, the hue contrast may be moderated, and the chromaticity of each color in the image may be fully exhibited. These effects may be further emphasized when the lightness of the gray color is suitably varied. By suitably selecting the color to replace the contour part, the lightness or saturation may be moderated at desired parts of images, thus widening the range of application to the display of images with extracted features for pattern recognition.

Figure 1:
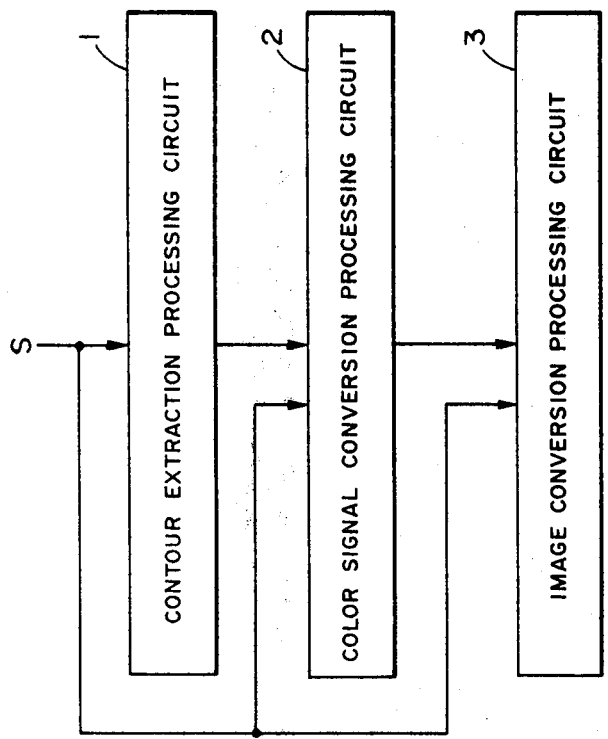
FIG. 1 is a block diagram schematically showing the construction of an embodiment of the present invention.

The present invention will now be described in detail with reference to the accompanying drawings. FIG. 1 is a view schematically showing the first embodiment of the signal processing device according to the present invention. Referring to FIG. 1, symbol S denotes an original image signal and reference numeral 1 denotes a contour extraction processing circuit which extracts contour image signals from the original image signals and then extracts signals of amplitudes greater than a predetermined value from contour image signals. Reference numeral 2 denotes a color signal conversion processing circuit which converts output signals from the contour extraction processing circuit into contour emphasized color signals. Reference numeral 3 denotes an image conversion processing circuit which removes signal components of the original image signal S corresponding to the output color signals from the color signal conversion processing circuit 2 and which replaces the removed signal components with the output color signals from the color signal conversion processing circuit 2. Describing the present invention with particular reference to the original image signal S, a color, which perceptually emphasizes the contour part, gray for example, replaces the contour part of the color image to obtain clearer images. When the signals obtained from a color scanner for reading out the color data from an image and for converting the color data into electric signals are original image signals, these original image signals consist of luminance signals containing only luminance distribution data and time-serially delayed, color-separated yellow, magenta, cyan, and black color signals.

As may be understood from the fact that the figures may be recognized with the luminance signals alone, the luminance signals contain the contour image data. The contour extraction processing circuit 1 extracts contour image signals from the luminance signals described above. The contour image signals are extracted from those signals of higher frequency components among the luminance signals, that is, from those with greater amplitude change. This processing may be performed by using a high-pass filter or by taking the difference between the original image signal and the time-serially slightly delayed signal. The amplitude of the output signal obtained from this processing represents the change in the luminance from the luminance signal, that is, the clearness of the contour. The pulse duration of this output signal represents the position of the contour.

In accordance with the present invention, a special color which perceptually emphasizes the contour, gray for example, converts the contour part of the color image. However, when the part thus converted is wide, part of the image is removed, thus degrading the image quality. Therefore, the width of conversion is preferably narrow. The contour extraction processing circuit 1 extracts from the original image signals the signal components whose amplitudes exceed a predetermined level. The magnitudes of these signal components represent the density of the color signals to be converted, and the pulse duration represent the positions of the color signals to be converted.

On the basis of the signals with amplitudes exceeding the predetermined value from the contour extraction processing circuit 1, the color signal conversion processing circuit 2 produce signals representing the part to be replaced by the contour emphasizing signals. Furthermore, on the basis of the original image signals, the color signal conversion processing circuit 2 produces respective color signals of yellow, magenta, cyan and black which are proportional to the contour emphasizing signals.

On the basis of the respective output signals from the color signal conversion processing circuit 2, the image conversion processing circuit 3 removes the color-separated signals of yellow, magenta, cyan and black of the original image which are to be replaced by the contour emphasizing signals, and inserts at the removed parts the contour emphasizing signals of the corresponding colors. The output signals thus obtained from the image conversion processing circuit 3 may be provided as color signal components for printing.

Examples of the circuits 1, 2 and 3 shown in FIG. 1 will now be described in more detail.

Figure 2:
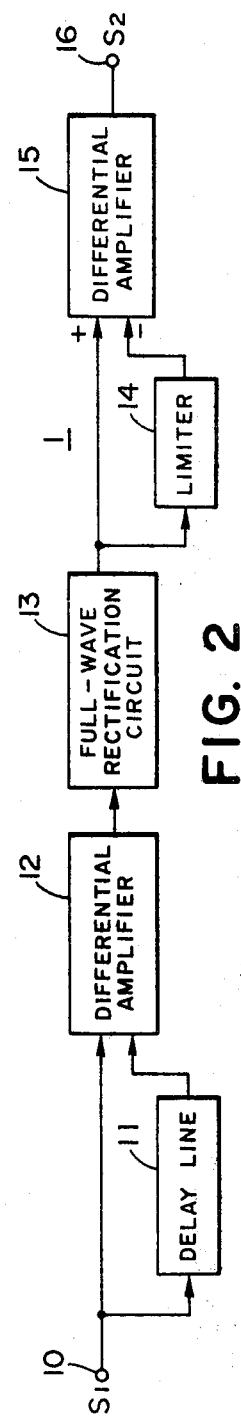
FIG. 2 is a block diagram showing an example of a contour extraction processing circuit shown in FIG. 1.

FIG. 2 shows an example of the contour extraction processing circuit 1. A luminance signal $S_1$ obtained by raster scanning of the original image signal S is input to an input terminal 10. The luminance signal $S_1$ is input to a differential amplifier 12 directly and through a delay line 11 having a delay time of about the Nyquist interval of the luminance signal $S_1$ to obtain a difference signal representing the difference between these two inputs. This difference signal contains data on the position of the contour image and the change in the luminance. This difference signal is in the positive cycle when the luminance changes from low to high and is in the negative cycle when the luminance changes from high to low. The output from the differential amplifier 12 is supplied to a full-wave rectification circuit 13 to invert the polarity of the signal components of negative magnitudes and to convert the signal into a signal having a positive half-cycles. A limiter 14 and a differential amplifier 15 extract, among the output signals from the full-wave rectification circuit 13, signal components whose amplitudes exceed a predetermined slice level of the limiter 14. These signal components are obtained as a contour image signal $S_2$ from an output terminal 16. An example of the limiter 14 is shown in FIG. 3.

Figure 3:
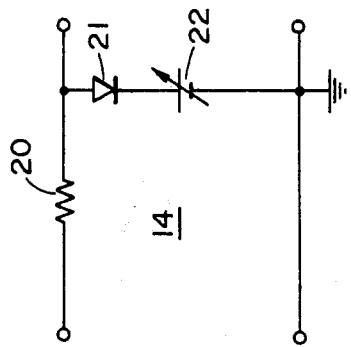
FIG. 3 is a circuit diagram showing an example of a limiter shown in FIG. 2.

Referring to FIG. 3, reference numeral 20 denotes a resistor; 21, a diode; and 22, a variable power source. The slice level described above is determined by the variable power source 22. By making this slice level variable, desired signal components may be extracted from the contour image signals.

FIG. 4 shown an example of the contour extraction processing circuit 1 which extracts contour image signals in two directions, the longitudinal direction and the transverse direction. The luminance signal $S_1$ of the original image signal S input to an input terminal 30 is obtained by raster scanning of the two-dimensional image. The delay line 11, the differential amplifier 12, and the full-wave rectification circuit 13 operate in the same manner as in the case of FIG. 2 to extract the contour image signals on the same scanning line. The luminance signal $S_1$ is fed to a differential amplifier 32 directly and through a delay line 31 having a delay time corresponding to one scanning operation. The respective luminance signals of two scanning lines adjacent to one scanning line are input to the differential amplifier 32 to extract the contour image signals in the direction perpendicular to the scanning direction. This contour image signal is fed to an analog switch 34 and an amplitude comparator 35 through a full-wave rectification circuit 33 operating in the same manner as the full-wave rectification a circuit 13 described above. The limiter 14 and the differential amplifier 15 operate in the same manner as described with reference to FIG. 2 to obtain signal components having amplitudes exceeding the predetermined slice level. The output of the full-wave rectification circuit 13 is also fed to the amplitude comparator 35 and the analog switch 34. Between the two contour image signals thus inputted, the signal of higher instantaneous value is extracted as the two-dimensional contour image signal $S_2$ via an output terminal 36.

FIG. 5 shows an example of the color signal conversion processing circuit 2 shown in FIG. 1. The contour image signal $S_2$ is input to an input terminal 40 from the contour extraction processing circuit 1. Amplifiers 41, 42, 43 and 44 produce the color signals of yellow, magenta, cyan, and black, respectively, to convert the contour part. The kind of colors to be inserted at the contour part may be changed by varying the amplification factors of the amplifiers 41, 42, 43 and 44. Respective color signals $S_Y$(yellow), $S_M$(magenta), $S_C$(cyan), and $S_B$(black) are output from output terminals 45, 46, 47 and 48. An amplifier 49 and a limiter 50 shape the contour image signal $S_2$ into a rectangular signal $S_3$ to facilitate the differentiation of the part to be replaced by the color signals. The rectangular signal $S_3$ is obtained from an output terminal 51. This rectangular signal $S_3$ is used as a recognition signal $S_8$ to be utilized for superposition of the original image signal with the color signals to be inserted into the contour part at the image conversion processing circuit 3, which will be described in more detail below.

Figure 6:
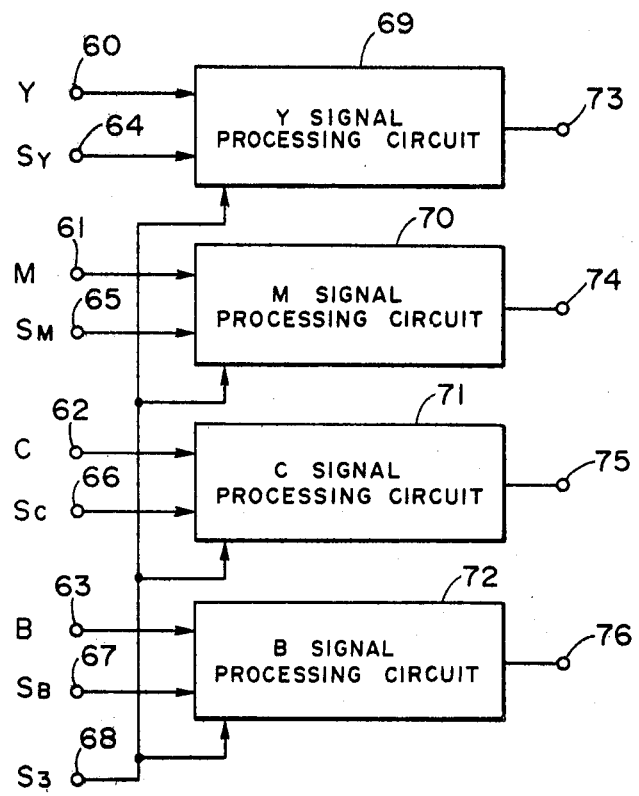
FIG. 6 is a block diagram showing an example of an image conversion processing circuit shown in FIG. 1.
Figure 7:
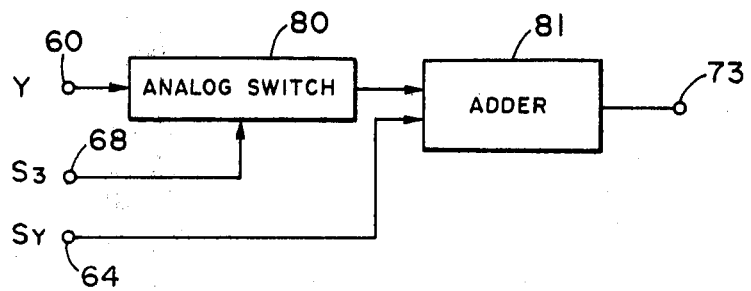
FIG. 7 is a block diagram showing another example of the image conversion processing circuit shown in FIG. 1.

FIG. 6 shows an example of the image conversion processing circuit 3. To input terminals 60, 61, 62 and 63 are input the respective color signals Y(yellow), M(magenta), C(cyan) and B(black) obtained by the color separation of the original image signal. To input terminals 64, 65, 66 and 67 are input the respective color signals $S_Y$(yellow), $S_M$(magenta), $S_C$(cyan) and $S_B$(black) to be inserted at the contour part. The recognition signal $S_8$ of the contour image output from the output terminal 51 in FIG. 5 is input to an input terminal 68. The color signals Y and $S_Y$, M and $S_M$, C and $S_C$ and B and $S_B$ are fed to a Y signal processing circuit 69, an M signal processing circuit 70, a C signal processing circuit 71 and a B signal processing circuit 72, respectively. These color signal processing circuits 69 to 72 are constructed as shown in FIG. 7 to correspond to the respective color signals. These color signal processing circuits 69 to 72 replace the original color signals with the color signals which constitute the image with emphasized contour with respect to the original image signal, and output these color signals as outputs for printing from output terminals 73, 74, 75 and 76.

FIG. 7 shows an example of one of the respective color signal processing circuits, for example, the Y signal processing circuit 69. Referring to FIG. 7, the color signal Y(yellow) of the original image input to the input terminal 60 is input to an adder 81 by controlling an analog switch 80 by the rectangular signal $S_3$ representing the position for inserting the contour emphasizing signals input to the input terminal 68 and removing the signal components at the part where the contour emphasizing signals are to be inserted. The contour emphasizing yellow color signal $S_Y$ is also fed to an adder 81. The adder 81 adds the contour emphasizing color signal $S_Y$ to the signal obtained by subtracting from the original image signal Y the signals at the contour part to be replaced. The yellow color signal of the image with emphasized contour may thus be obtained. The yellow color signal of the image with emphasized contour is obtained from the output terminal 73 and is fed to the printer. Similar processings are performed in the signal processing circuits 70 to 72 for the color signals M, C and B to produce the color signals of the image with emphasized contour which are obtained from the respective output terminals 74 to 76.

Figure 8:
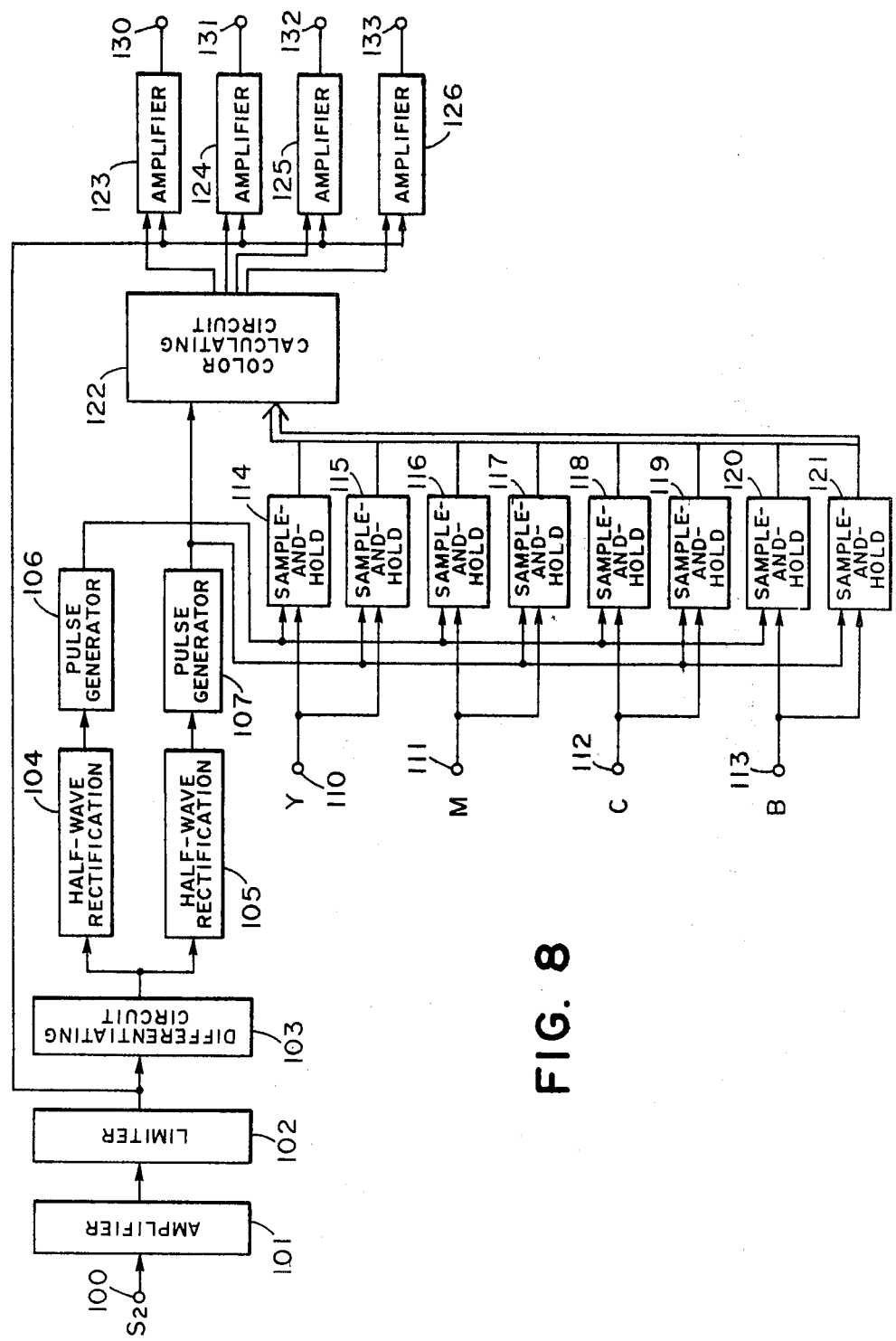
FIG. 8 is a block diagram showing another example of the color signal conversion processing circuit.

An example of the configuration of the color signal conversion processing circuit is shown in FIG. 8 wherein the color signals for replacing the contour part are formed in association with the characteristics of the original image signals surrounding the contour part. Referring to FIG. 8 the contour image signal $S_2$ from the contour extraction processing circuit 1 is input to an input terminal 100. The contour image signal $S_2$ is converted by an amplifier 101 and a limiter 102 into a pulse signal representing the position of the contour to be replaced. The output of the limiter 102 is fed to a differentiating circuit 103 to form a trigger signal representing the leading edge and the trailing edge of the pulse signal. This trigger signal represents the positions of the edges of the contour part. The output from the differentiating circuit 103 is fed to half-wave rectification circuits 104 and 105. The half-wave rectification circuit 104 and a pulse generator 106, and the half-wave rectification circuit 105 and a pulse generator 107, produce pulse signals representing the positions of the leading edge and the trailing edge of the contour, respectively. The pulse signals are fed as sampling pulse signals to sample-and-hold circuits 114 to 121. The color signals Y(yellow), M(magenta), C(cyan) and B(black) of the original image are fed to the sample-and-hold circuits 114 and 115, 116 and 117, 118 and 119, and 120 and 121 through input terminals 110, 111, 112 and 113, respectively. Then, the sample-and-hold circuits 114, 116, 118 and 120 hold the respective color signals representing the leading edge of the contour, and the sample-and-hold circuits 115, 117, 119 and 121 hold the respective color signals representing the trailing edge of the contour. The output from the pulse generator 107 is fed to a color calculating circuit 122 together with the outputs from the sample-and-hold circuits 114 to 121. The color calculating circuit 122 may comprise a microcomputer or a memory device such as a ROM or RAM. The color calculating circuit 122 controls the amplification factors of amplifiers 123 to 126 for the respective color signals Y, M, C and B on the basis of the characteristics of the signals of the leading edge and the trailing edge of the contour so that the color signals to replace the contour part may be obtained. It is to be noted that the color calculating circuit 122 stores in advance the color signals which are effective for contour emphasis by the lightness contrast, the saturation contrast, and the hue contrast and which are obtained based on the actual measurements so that these color signals may replace the color signals surrounding the contour part. In this manner, the contour emphasizing color signals $S_Y$, $S_M$, $S_C$ and $S_B$ for replacing the contour part are output from output terminals 130 to 133 of the amplifiers 123 to 126.

In the embodiment described above, the description has been made with reference to the case wherein a color image display device is applied to a printer for displaying color images on paper sheets or the like. However, the present invention is similarly applicable to color image devices such as color television receivers and color liquid crystal display devices. In the case of such a display device, RGB signals are used as the separated color signals in place of the YMC signals. Furthermore, in the embodiment described above, the present invention has been made with reference to signal processing for electrically extracting contour images. However, the signal processing as described above may be performed after converting by a scanner the images of the contour image into electric signals from the contour image obtained by an optical means. The contour image may be formed by a computer.

The present invention has been described with reference to replacing the contour with a color which perceptually emphasizes the contour. However, when the background (e.g., paper sheet) for displaying the image is white or black, the contour emphasizing effect may be obtained with a neutral color.

In summary, the advantages described below may be obtained according to the present invention:

(1) Since a special color to cause perceptual emphasis is used for emphasizing the contour of the image, the present invention may be similarly applied to cases wherein the gradation of the image display device is low.

(2) Since the portions of the image to be replaced by the special color are emphasized according to the signals of the image, the contour may be emphasized to match the image.

(3) The hue contrast may be eliminated.

(4) The emphasis of particular picture elements in the image is possible.

The second embodiment of the present invention will now be described in detail. This embodiment combines both the contour emphasis processing and the half-tone display processing.

The second embodiment of the present invention will be described with reference to the accompanying drawings.

Figure 9:
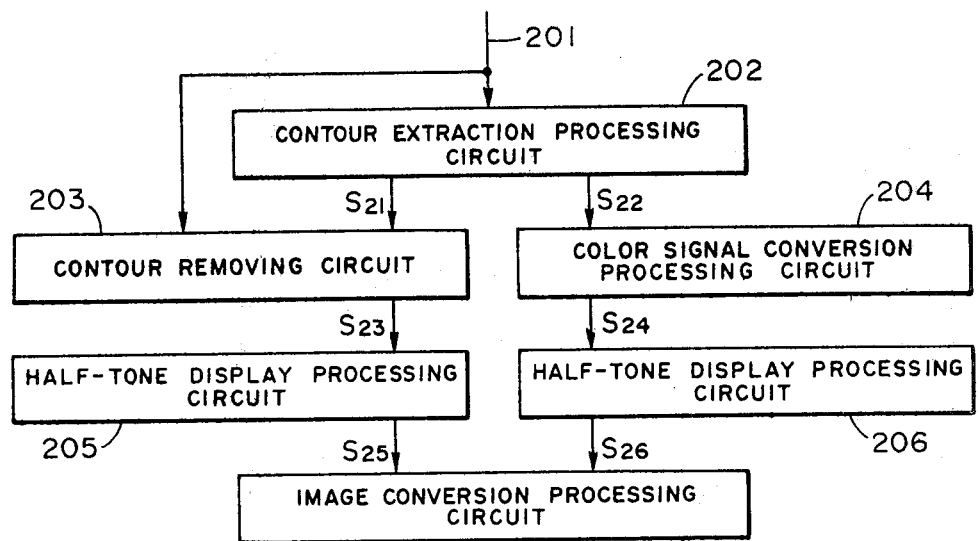
FIG. 9 is a block diagram schematically showing the construction of a second embodiment of the present invention.

FIG. 9 schematically shows the construction of a color image display device according to the present invention. Referring to FIG. 9, reference numeral 201 denotes a signal of the original image; 202, a contour extraction processing circuit for extracting a contour image signal $S_{22}$ from the original image signal 201; 203, a contour removing circuit for removing the contour image signal $S_2$ from the original image signal 201 to produce an output signal $S_{23}$; 204, a color signal conversion processing circuit for producing a contour emphasizing color signal $S_{24}$ to replace the contour part from the contour image signal $S_{22}$; 205 and 206, half-tone display processing circuits which receive outputs of the circuits 203 and 204, respectively, and which perform processings to display a half-tone image with binary picture elements; and 207, an image conversion processing circuit for producing an image which has undergone the contour emphasizing processing and the half-tone display processing from output signals $S_{25}$ and $S_{26}$ from the half-tone display processing circuits 205 and 206.

The original image signal 201 is obtained by a color scanner which reads the color image data from the original image and converts the color image data into electric signals. The original image signal 201 consists of color separated signals of yellow, magenta, cyan and black, and a luminance signal having only the luminance distribution data. Since the luminance signal contains the contour image data, the contour extraction processing circuit 202 extracts the contour image signal $S_{22}$ from the luminance signal. This processing may be performed by a high-pass filter as in the case of the first embodiment, by taking a difference signal between the original signal and a time-serially delayed signal, or the like.

The contour part of the color image is converted by a special color, for example black, which emphasizes the contour. When the contour part thus converted is wide, part of the image is deleted, degrading the image quality. Therefore, as in the case of the first embodiment, the contour extraction processing circuit 202 extracts those signals alone which have amplitudes exceeding a predetermined level to suitably narrow the width of the converted contour. As in the case of the first embodiment, the amplitude of this signal represents the density of the color signals to be converted, and the duration represents the position of the color signals to be replaced.

On the basis of the contour image signal $S_{22}$ output by the contour extraction processing circuit 202, the contour removing circuit 203 removes the signal components from the respective color signals of the original image at the part to be converted by the contour emphasizing color signals. On the basis of the output signal $S_{23}$ from the contour extraction processing circuit 202, the color signal conversion processing circuit 204 produces the color signals of yellow, magenta, cyan and black constituting the contour emphasizing color signal $S_{24}$. The half-tone display processing circuits 205 and 206 subject the signals $S_{23}$ and $S_{24}$ output by the contour removing circuit 203 and the color signal conversion processing circuit 204, respectively, to convert them into binary digital signals. The image conversion processing circuit 207 synthesizes the output signals $S_{25}$ and $S_{26}$ from the half-tone display processing circuits 205 and 206 to form an image signal to be displayed. The contour extraction processing circuit 202 may comprise a circuit of the first embodiment shown in FIG. 2 or 4. The color signal conversion processing circuit 204 may comprise a circuit of the first embodiment shown in FIG. 8.

Figure 10:
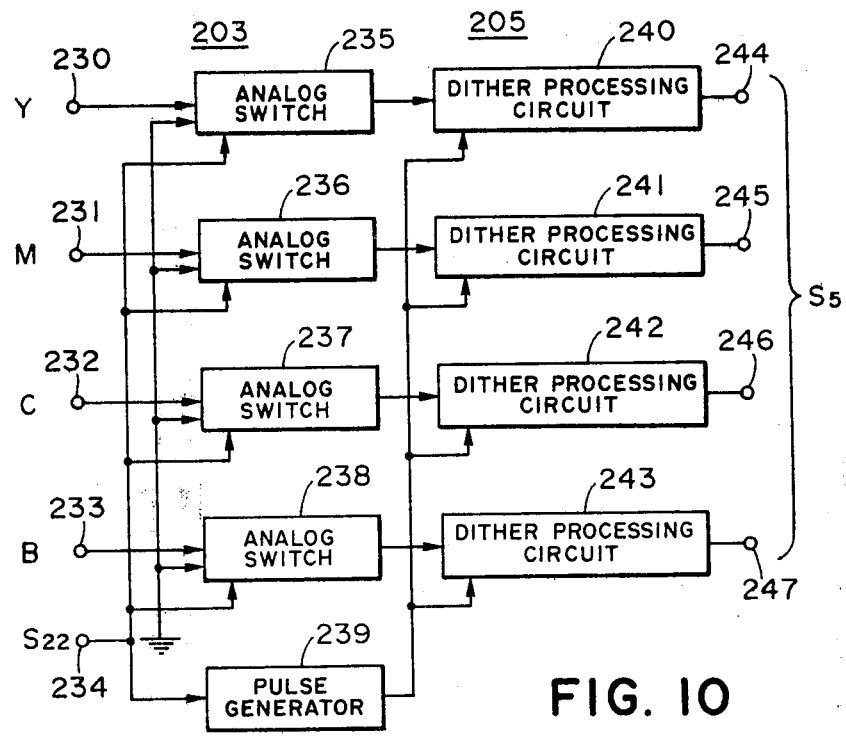
FIG. 10 is a block diagram showing examples of a contour removing circuit and a half-tone display processing circuit.

FIG. 10 shows an example of the contour removing circuit 203 and the half-tone display processing circuit 205 shown in FIG. 9. Referring to FIG. 10, the contour removing circuit 203 comprises analog switches 235, 236, 237 and 238, to the input terminals of which are fed the contour image signal $S_{22}$ and the color signals Y(yellow), M(magenta), C(cyan) and B(black) of the original image, respectively. The contour image signal $S_{22}$ input from an input terminal 234 is in the positive cycle at the part for emphasizing the contour and has zero amplitude at the other parts. In response to this signal, the analog switches 235, 236, 237 and 238 operate to make zero the amplitudes of the signal components at the contour part of the respective color image signals Y(yellow), M(magenta), C(cyan) and B(black) of the original image input to the analog switches 235, 236, 237 and 238 through input terminals 230, 231, 232 and 233, respectively.

The half-tone display processing circuit 205 comprises a pulse generator 239 and dither processing circuits 240 to 243. The output signal $S_{22}$ from the contour extraction processing circuit 202, which is input through the inputted terminal 234, is fed to the pulse generator 239 to generate a pulse synchronized with the leading edge of the contour part as a sampling pulse of the dither processing circuits 240, 241, 242, and 243. The dither processing circuits 240, 241, 242 and 243 convert the respective color signals of yellow, magenta, cyan and black into dither-processed binary signals which are output from output terminals 244, 245, 246 and 247.

Figure 11:
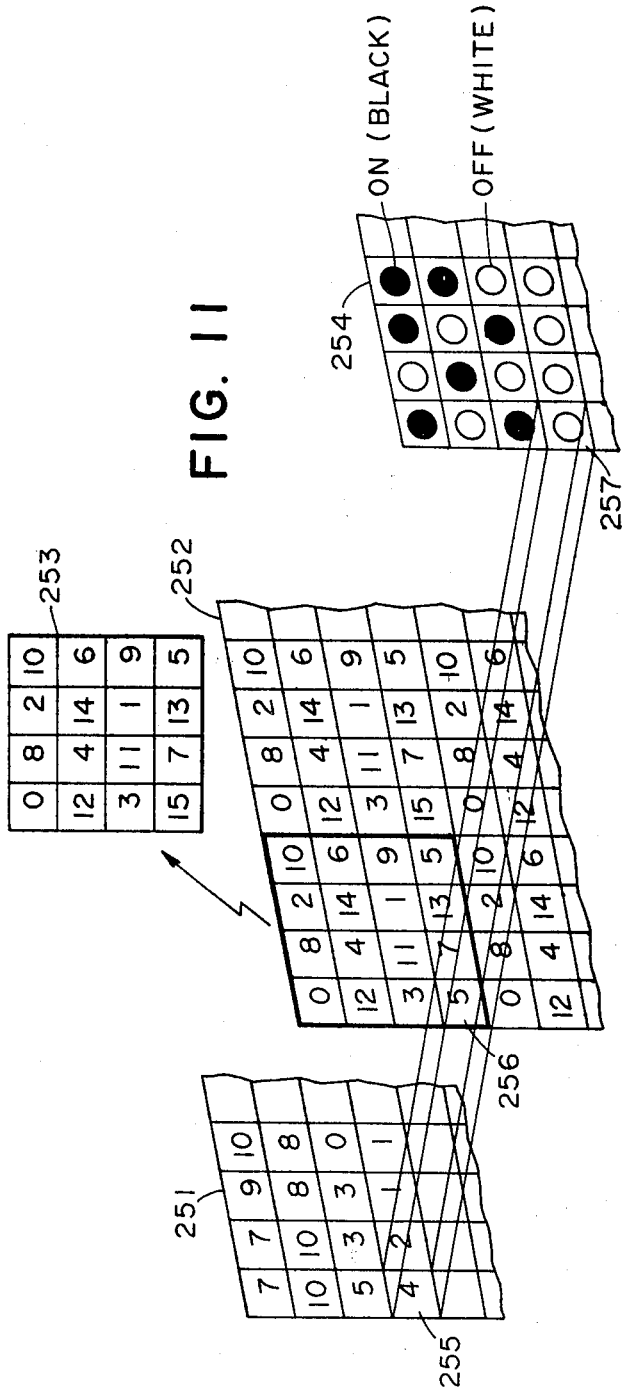
FIG. 11 is a diagram showing the operating principle of the systematic dither method according to the present invention.

The operation principle of the systematic dither method will now be described with reference to FIG. 11. Referring to FIG. 11, reference numeral 251 shows picture element levels of the input image, which represent the density pattern of the picture element for the case where 16 levels from 0 to 15 may be taken; 252, a mask pattern for providing a threshold level for binary encoding wherein valves of 0 to 15 are arranged at predetermined positions; and 253, a 4×4 dither matrix as the basis of the mask pattern. In the systematic dither method, the basic dither matrix is provided by an n×n matrix (where n is a positive integer). Reference numeral 254 denotes a display device.

According to the dither method, the threshold level for each picture element differs according to the position of the picture element. Thus, the threshold level is independent of the picture element level and is determined solely by the coordinates of the picture element. For example, since the threshold level of a dot 256 of the dither matrix corresponding to a picture element 255 at the fourth row and first column of the input image is 15 and the picture element level of the picture element 255 is 4, a pattern 257 of the display device 254 becomes off (white).

Figure 12:
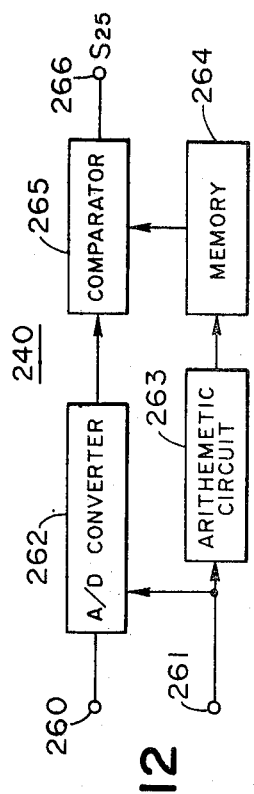
FIG. 12 is a block diagram showing an example of a dither processing circuit for the systematic dither method of FIG. 11.

FIG. 12 shows an example of the dither processing circuits 240 to 243 wherein reference numeral 260 denotes an input terminal for the color signals; 261, an input terminal for pulse signals generated by the pulse generator 239 (FIG. 10); 262, an A/D converter which converts the color signals input via the input terminal 260 into digital signals at the timing of the pulse signals described above; 263, an arithmetic circuit which counts the number of pulse signals described above to calculate the coordinates (i, j) of each picture element; 264, a memory which stores the threshold levels corresponding to the coordinates (i, j) of each picture element; 265, a comparator for comparing the A/D converter output with the threshold level; and 266, an output terminal of the comparator 265. Referring to FIG. 12, it is assumed that there are 16 picture element levels from 0 to 15 of the input image signal, that is, each picture element contains data corresponding to 4-bits when the size of the dither matrix is 4×4. In this case, the A/D converter 262 may be a 4-bits A/D converter. The arithmetic circuit 263 counts the number of pulses output from the pulse generator 239 to obtain the two-dimensional coordinates (i, j). The arithmetic circuit 263 thus designates an address of the memory 264 from which the threshold level of the coordinates, (i, j) is read out. The memory 264 may comprise a programmable read-only memory (PROM). Since the mask pattern may be expressed by repetition of the basic dither matrix of 4×4, the memory 264 requires a capacity of 16×4 bits when considered in terms of the basic dither matrix. To the comparator 265 is input a color signal $x_{ij}$ of 4-bits having coordinates (i, j), and a threshold level $c_{ij}$ of 4-bits to produce at the output terminal 266 as the output signal $S_{25}$ a binary signal 1 when $x_{ij} \geq c_{ij}$ and a binary signal 0 when $x_{ij} < c_{ij}$.

Configuration of the half-tone display circuit 206 may be similar to that of the half-tone display processing circuit 205. The signal for replacing the contour part does not require the half-tone display of the general image signal, and the width of the contour is narrower than the general image. Therefore, the size of the basic dither matrix may be equal to or less than that for the half-tone display processing circuit 205.

The image conversion processing circuit 207 comprises AND circuits to which are input the output signals $S_{25}$ and $S_{26}$ from the half-tone display circuits 205 and 206, respectively. The image conversion processing circuit 207 extracts the respective color signals synthesized by these AND circuits for display.

In the second embodiment of the present invention described above, the dither method is utilized for the half-tone display processing. However, as the half-tone display processing, the dot matrix method may alternatively be adopted wherein the image is divided into minute unit areas in which the areas of minute elements such as dots or lines are continuously varied to reproduce the density of the original image; the pulse width modulation method which modifies the dot matrix method and uses a variable dot pattern; the pulse frequency modulation method which uses a fixed dot pattern; the delta-sigma modulation method; or the like.

In the second embodiment described above, the color signals to replace the signals at the contour part for emphasizing this contour part are also subjected to the half-tone display processing. However, it is to be understood that the advantageous effects of the present invention may be obtained only with the binary encoding processing.

In the second embodiment of the present invention, the image was displayed with a discrete binary pattern. However, the image may, alternatively, be displayed with a discrete pattern of more than two values by injecting ink at the same place two or three times using an ink-jet printer or the like. In this case, since the image quality is degraded as compared with a continuous image, the half-tone display processing must be performed to improve the image quality. The image quality may further be improved by performing the contour emphasis processing.

The present invention has been described with reference to the contour emphasis processing utilizing the simultaneous contrast. However, the simultaneous contrast also occurs with neutral images. Therefore, if the half-tone display processings for the contour image signals and the original image signals are separately performed, similar effects as obtainable with the color display may be obtained.

In the embodiments of the present invention described above, the description has been made with reference to the image processing of general images. However, with a pattern recognition image display device, it is necessary to extract the characteristics such as the shape of the image and the contour data for the purpose of displaying the image. In such a case, the half-tone display processing is performed for the contour image signals, and the general quantization processing instead of the half-tone display processing is performed for the other image signals.

In summary, in accordance with the present invention, half-tone display may be performed in combination with contour emphasis without impairing the distinctness of the contour part. Furthermore, since separate half-tone display processings suitable for the image part and the contour part to be emphasized are performed, the contour may be effectively emphasized.

What we claim is:

1. An image signal processing unit, comprising:
    a contour extraction processing circuit for extracting a contour image signal representing a contour part of an image from an input image signal;
    a color signal conversion processing circuit for converting the contour image signal into an image signal for causing simultaneous contrast phenomenon between a color represented by the converted image signal and a color represented by an ambient image signal representing an ambient part of the image adjacent the contour part; and
    an image conversion processing circuit for producing a contour emphasized image signal from the input image signal and an output signal from said color signal conversion processing circuit.

2. A unit according to claim 1, wherein said image conversion processing circuit removes color signals of the contour part according to the output signal from said contour extraction processing circuit.

3. A unit according to claim 1, wherein said color signal conversion processing circuit controls at least one of the lightness, saturation, hue, or spatial width of the contour emphasizing color signal according to changes in at least one of a luminance or density of the contour part of the image.

4. A unit according to claim 3, wherein said color signal conversion processing circuit controls at least one of the position or width of the contour part to be replaced by the contour emphasizing color signal according to changes in at least one of the luminance or density of the contour part.

5. A unit according to claim 1, wherein said color signal conversion processing circuit controls the contour emphasizing color signal according to color signals surrounding the contour part.

6. A unit according to claim 1, wherein said color signal conversion processing circuit generates a plurality of color signals from the output signal from said contour extraction processing circuit so as to generate the contour emphasizing color signals.

7. A unit according to claim 1, wherein said input image signal is a neutral image signal.

8. A unit according to claim 1, wherein said input image signal contains color signal components of cyan, magenta, and yellow.

9. An image signal processing unit, comprising:
    a contour extraction processing circuit for extracting color signals representing a contour part of an image from an input image signal;
    a color signal conversion processing circuit for replacing color signals of the contour part with contour emphasizing color signals on the basis of an output signal from said contour extraction processing circuit;
    an image conversion processing circuit for producing a contour emphasized image signal from the input image signal and an output signal from said color signal conversion processing circuit; and
    a first half-tone display processing circuit for performing half-tone display processing of the input image signal for the part of the image other than the contour part.

10. A unit according to claim 9, wherein said first half-tone display processing circuit processes the input image signal according to the systematic dither method.

11. A unit according to claim 9, further comprising a second half-tone display processing circuit for performing half-tone display processing of the input image signal for the contour part.

12. A unit according to claim 1, wherein said first and second half-tone display processing circuits process the input image signal for the contour part according to the systematic dither method.

13. A unit according to claim 12, wherein the number of rows and columns of a basic dither matrix of said first half-tone display processing circuit are greater than the number of rows and columns of a basic dither matrix of said second half-tone display processing circuit.

14. A unit according to claim 9, wherein said input image signal is a neutral image signal.

15. A unit according to claim 9, wherein said input image signal contains color signal components of cyan, magenta, and yellow.

16. An image signal processing unit comprising:
- a contour extraction processing circuit for extracting color signals representing a contour part of an image from an input image signal, said contour extraction processing circuit includes a comparison circuit which compares the input image signal and a delayed signal which is delayed by a predetermined time from the input image signal;
- a color signal conversion processing circuit for replacing color signals of the contour part with contour emphasizing color signals on the basis of an output signal from said contour extraction processing circuit; and
- an image conversion processing circuit for producing a contour emphasized image signal from the input image signal and an output signal from said color signal conversion processing circuit.

17. A unit according to claim 16, wherein said comparison circuit extracts components of the input image signal and the delayed signal which have a value exceeding a predetermined value.

18. A unit according to claim 17, wherein said contour extraction processing circuit has means for varying the predetermined value.

19. An image signal processing unit comprising:
- a contour extraction processing circuit for extracting color signals representing a contour part of an image from an input image signal;
- a color signal conversion processing circuit for replacing color signals of the contour part with contour emphasizing color signals on the basis of an output signal from said contour extraction processing circuit, said color signal conversion processing circuit generating a plurality of color signals from the output signal from said contour extraction processing circuit thereby generating the contour emphasizing color signals, and having a plurality of amplifying circuits for amplifying the output signal from said contour extraction processing circuit for each of the plurality of color signals; and
- an image conversion processing circuit for producing a contour emphasized image signal from the input image signal and an output signal from said color signal conversion processing circuit.

20. An image signal processing unit comprising:
- a contour extraction processing circuit for extracting color signals representing a contour part of an image from an input image signal;
- a color signal conversion processing circuit for replacing color signals of the contour part with contour emphasizing color signals on the basis of an output signal from said contour extraction processing circuit, and for controlling the contour emphasizing color signals according to color signals surrounding the contour part, said color signal conversion processing circuit having a holding circuit for holding values of the color signals at a leading edge and at a trailing edge of the contour part; and
- an image conversion processing circuit for producing a contour emphasized image signal from the input image signal and an output signal from said color signal conversion processing circuit.

21. A unit according to claim 20, wherein said color signal conversion processing circuit controls amplification factors of the respective color signals according to the values held by said holding circuit of the color signals at the leading edge and the trailing edge of the contour part.

* * * * *

UNITED STATES PATENT AND TRADEMARK OFFICE
CERTIFICATE OF CORRECTION

PATENT NO. : 4,415,920
DATED : November 15, 1983
INVENTOR(S) : YUZO KATO, et al.

It is certified that error appears in the above-identified patent and that said Letters Patent is hereby corrected as shown below:

Column 4, line 51, change "represent" to --represents--;

line 56, change "produce" to --produces--.

Column 5, line 24, change "half-cycles" to --half-cycle--;

line 37, change "shown" to --shows--;

line 57, delete "a".

Column 9, line 49, change "input" to --inputted--;

line 50, change "inputted" to --input--.

Signed and Sealed this

Fifth Day of June 1984

[SEAL]

Attest:

GERALD J. MOSSINGHOFF

Attesting Officer

Commissioner of Patents and Trademarks